United States Patent [19]

McKenzie

[11] Patent Number: 5,335,696
[45] Date of Patent: Aug. 9, 1994

[54] THREE-WAY WEIR STYLE VALVE

[75] Inventor: Jeffrey J. McKenzie, Watertown, Minn.

[73] Assignee: Fluoroware, Inc., Chaska, Minn.

[21] Appl. No.: 29,112

[22] Filed: Mar. 10, 1993

[51] Int. Cl.$^5$ ............................................. F16K 31/12
[52] U.S. Cl. ................................. 137/883; 137/863; 137/892; 251/331
[58] Field of Search ............... 137/883, 863, 602, 892, 137/898, 605, 606, 607; 251/335.2, 324, 325, 319, 320, 331

[56] References Cited

U.S. PATENT DOCUMENTS

| | | |
|---|---|---|
| 2,907,346 | 10/1959 | Fortune . |
| 3,105,507 | 10/1963 | Dunmire . |
| 3,175,473 | 3/1965 | Boteler et al. ............ 251/331 X |
| 3,198,205 | 8/1965 | Boteler . |
| 3,206,159 | 9/1965 | Anderson et al. ............ 251/28 |
| 3,451,423 | 6/1969 | Priese ............ 251/331 |
| 3,633,874 | 1/1972 | Veugelers . |
| 4,653,526 | 3/1987 | Hoiss . |
| 4,967,794 | 11/1990 | Tsutsui et al. ............ 137/883 X |
| 4,977,929 | 12/1990 | Chinnock et al. . |
| 5,002,086 | 3/1991 | Linder et al. . |
| 5,004,011 | 4/1991 | Linder et al. . |

*Primary Examiner*—Martin P. Schwadron
*Assistant Examiner*—Kevin L. Lee
*Attorney, Agent, or Firm*—Palmatier, Sjoquist & Helget

[57] ABSTRACT

The invention disclosed is a three-way weir valve. The valve housing has a common flow duct and two additional flow ducts, all connectable to external flow lines. A weir with two valve seats on opposite sides of the weir separates the common flow duct from the two additional flow ducts. Two coaxial diaphragms are arranged to engage with the weir valve seats. The common flow duct communicates with one flow duct over one of the weir valve seats and communicates with the other flow duct over the other weir valve seat. The two diaphragms are engaged with compressors connected to pistons engaged in pneumatic cylinders. An air line connects the two pneumatic cylinders. One diaphragm and compressor are biased towards engagement with its other weir valve seat resulting in a normally closed position. The other diaphragm is biased away from engagement with its weir valve seat resulting in a normally open position. Actuation of the pneumatic cylinders moves each diaphragm in a direction opposite each respective diaphragm's bias. Where fluid is flowing into the valve by way of the common flow duct and then to one of the flow ducts, actuation of the pneumatic cylinders transfers the fluid flow path from one flow duct to the other flow duct.

10 Claims, 3 Drawing Sheets

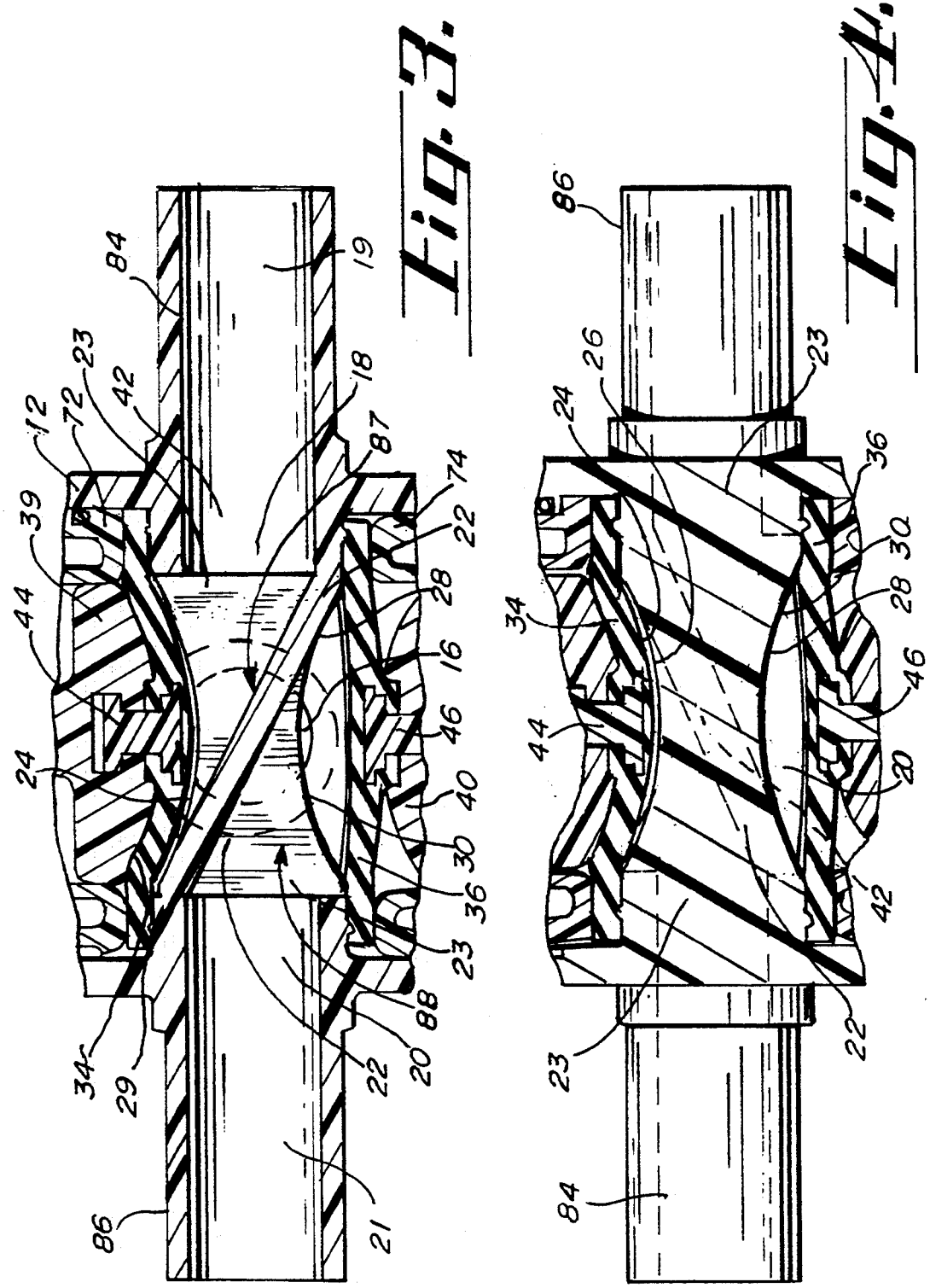

THREE-WAY WEIR STYLE VALVE

BACKGROUND OF THE INVENTION

The present invention relates to valves, more particularly to weir valves.

A weir valve is a valve utilizing a resilient diaphragm that engages a weir and prevents the flow of fluid over the weir. Weir valves provide excellent sealing and isolation characteristics to effectively contain the fluid being controlled and substantially eliminates leaking or migration of the controlled fluid into the valve mechanisms or out of the valve. Weir valves are also more amenable than conventional valves in designing streamlined fluid flow courses through the valves.

In many applications, particularly in the semiconductor industry, quiescent or dead spots in the fluid flow course must be avoided as these can cause the fluid to become stagnant or to degrade and contaminants or suspended solids can accumulate in the quiescent or dead spots. Any of these can cause significant quality control problems.

In many applications in the semiconductor industry it is necessary to instantaneously change fluid flow to a particular process. Additionally, need arises to alternate a particular fluid flow between different processes or equipment. This type of fluid switching can be accomplished with two two-way weir valves and an external T-connection. However, when two valves are used, the previously mentioned problems of fluid degradation or contaminant build-up are exacerbated.

SUMMARY OF THE INVENTION

The invention disclosed is a 3-way weir valve. The valve housing has a common flow duct and two flow ducts, all connectable to external flow lines. A weir with two valve seats on opposite sides separates the common flow duct from the two flow ducts. Two coaxial diaphragms are arranged to engage with the weir valve seats. The common flow duct communicates with the first flow duct over one of the weir valve seats and communicates with the second flow duct over the other weir valve seat. The two diaphragms are operated by compressors connected to pistons engaged in pneumatic cylinders. An air line connects the two pneumatic cylinders. One diaphragm and compressor are biased towards engagement with one of the weir valve seats resulting in a normally closed position. The other diaphragm is biased away from engagement with the other weir valve seat resulting in a normally open position. Actuation of the pneumatic cylinders moves each diaphragm in a direction opposite each respective diaphragm's bias. Where fluid is flowing to the valve into the common flow duct and then to the flow ducts, the actuation of the pneumatic cylinders transfers the fluid flow from one flow duct to the other.

An object of the invention is to provide a weir valve configured as a three-way valve, and having the attendant advantages of weir valves, specifically: minimal dead space or quiescent areas within the valve, clean fluid flow characteristics, and superior isolation and sealing characteristics.

An advantage of the invention is that the amount of space necessary for the three-way weir valve arrangement is significantly reduced when compared to two two-way weir valves combined for the same valving effect. Additionally, an external T-connection which would be necessary when using the two two-way valves is eliminated. The three-way valve thus reduces ancillary plumbing exterior of the valve and correspondingly minimizes dead space or quiescent areas of the flowing fluid in the exterior plumbing.

Another advantage of the invention is the substantially identical flow characteristics of the two flow ducts.

Another feature of the invention as configured is that the actuation by a single pressurization operates both diaphragms simultaneously and in an opposing manner, that is, when one is opened the other is closed.

Another object and advantage of the invention as configured is that the three flow ducts, as they exit the valve housing, are all coplanar facilitating installation.

Another feature of the invention is that the common flow duct can be utilized as a common inlet or a common outlet.

Another advantage of the invention is that the configuration of the valve permits the device to be readily manufactured by injection molding with minimal or no additional machining after molding.

BRIEF DESCRIPTION OF THE DRAWINGS

FIG. 3 shows a of the three-way weir valve shown at sectional line 3—3 of FIG. 2.

FIG. 4 shows a sectional of the three-way weir valve taken at plane 4—4 of FIG. 2.

DETAILED DESCRIPTION OF THE PREFERRED EMBODIMENTS

Figure 1:
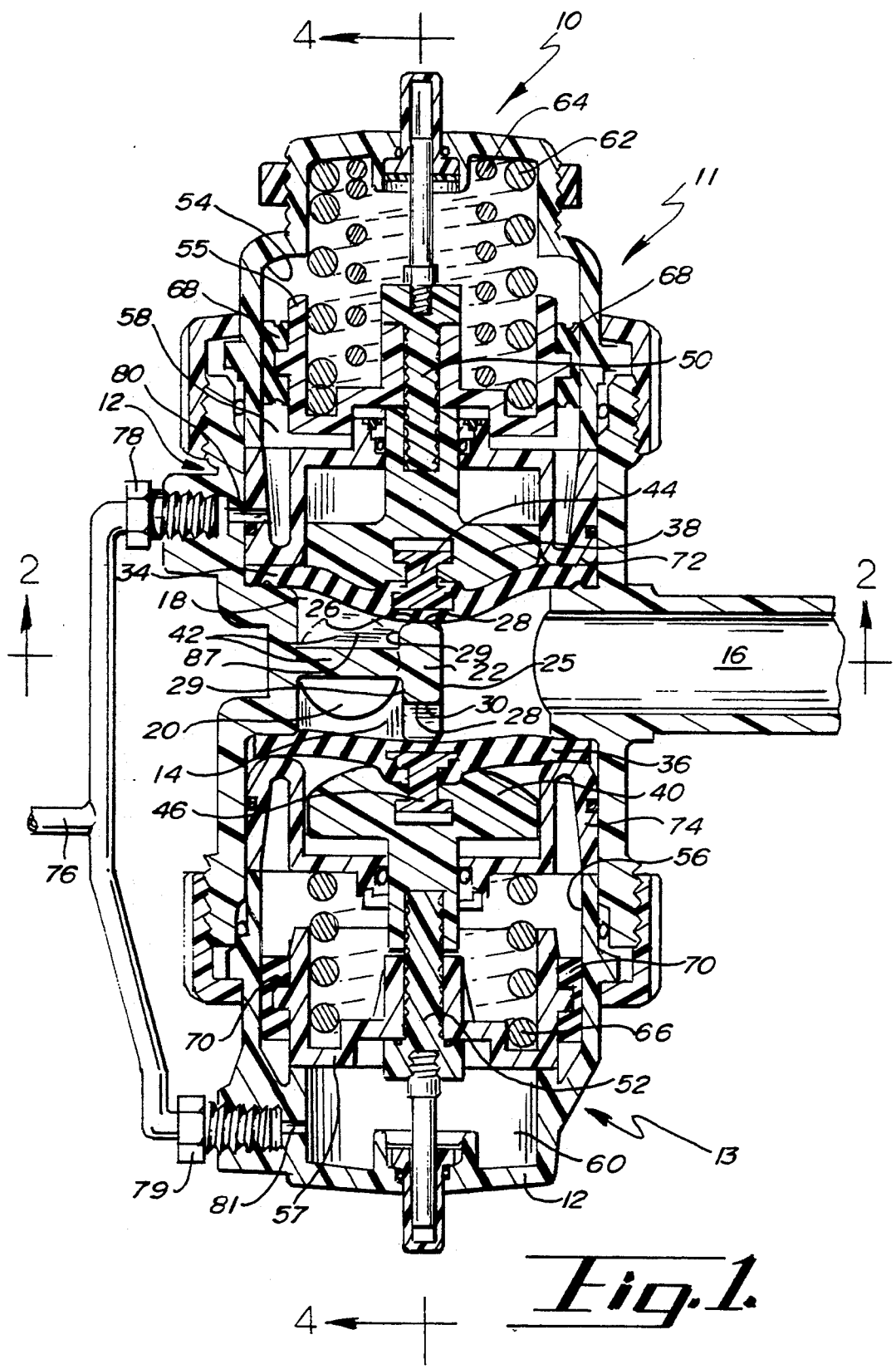
FIG. 1 shows a sectional view of the three-way weir valve.

FIG. 1 shows a cross sectional view of the three-way weir valve 10. The valve 10 includes an upper body portion 11 and a lower body portion 13. Intermediate the body portions is an interior chamber 14. Within the interior chamber 14 is a weir 22 and a divider plate 42. The weir 22 is shown with a first edge portion 28 which constitutes a first valve seat 26 and a second edge portion 28 to constitute the second valve seat 30. A common flow duct 16 is shown leading into the valve housing 12 to the weir 22. The first flow duct 18 with a distal portion 19 and the second flow duct 20 with a distal portion 21 are shown in the interior chamber 14 opposite the common flow duct 16 relative to the weir 22. The divider plate 42 separates the first flow duct 18 from the second flow duct 20. The top surface 87 of the divider plate 42 is shown below the first diaphragm 34.

The first diaphragm 34 is shown engaged in a closure position with the first valve seat 26 of the weir 22. The first diaphragm 34 is connected to the first compressor 38 by way of the diaphragm connecting member 44.

The upper body portion 11 is shown to house the first compressor 38 connected to the first compressor stem 50 and further connected to the first piston 55. A bias means consisting of springs 62, 64 is shown to urge the first compressor 38 and first diaphragm 34 toward the first valve seat 26 of the weir 22. The first diaphragm 34 is retained by the diaphragm retaining collar 72. Also contained within the upper body portion 11 is a first cylinder 54 which is engaged by the first piston 55 through a seal 68. First expansion chamber 58 is shown between the first piston 55 and the diaphragm retaining collar 72. The first expansion chamber 58 communicates by way of an air inlet 80 to the fitting 78 which attaches the air line 76 to the upper body portion 11.

The lower body portion is shown to have a slightly different configuration relating to the bias means and the actuation means. The second diaphragm 36 is shown separated from the second valve seat 30 of the weir 22. A retaining collar 74 retains the second diaphragm 36. The second diaphragm 36 is connected to the second compressor 40 by way of the diaphragm connecting member 46. The second compressor 40 is attached to the second compressor stem 52 by way of a threaded connection or other suitable means. The compressor stem 52 is connected to the second piston 57 which is slidably engaged with the second cylinder 56 through the seal 70. A bias means comprising a spring 66 is shown to urge the second piston 57 and thus the compressor stem 52, the second compressor 40, and the second diaphragm 36 in a downward direction away from the weir 22. A second expansion chamber 60 is seen located between the valve housing 12 and the second piston 57. The second expansion chamber 60 is connected to the air line 76 through the air inlet 81 and the fitting 79.

Figure 2:
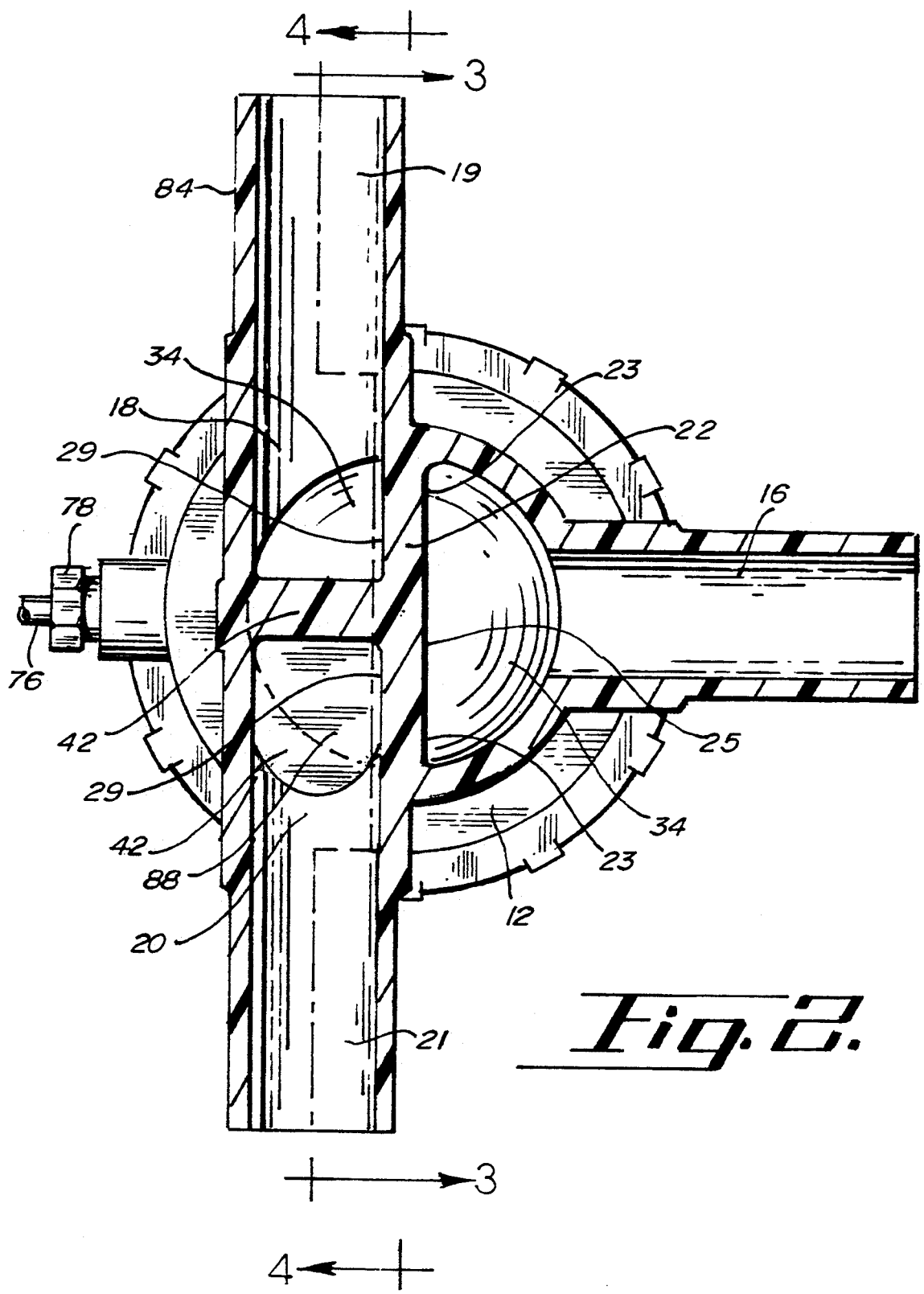
FIG. 2 shows a sectional of the weir valve taken at plane 2—2 of FIG. 1.

FIG. 2 shows a sectional of the three-way weir valve 10 taken at plane 2—2 of FIG. 1. This figure shows the common flow duct 16 oriented at a right angle to the first flow duct 18 and the second flow duct 20. The first flow duct 18 is separated from the second flow duct 20 by the divider plate 42 which is integral with the second face 29 of the weir 22. The weir 22 has two end portions 23. Visible in the view of FIG. 2 is the lower surface 88 of the divider plate 42. The common flow duct 16 is separated from the first and second flow ducts 18, 20 by way of the weir 22. The first face 25 of the weir 22 faces the common flow duct 16. The second face 29 is on the opposite side of the weir 22. The second face 29 adjoins the first flow duct 18 and the second flow duct 20.

FIG. 3 is a sectional taken along the jagged sectional line 3—3 of FIG. 2. The first diaphragm 34 is shown engaged with the weir 22. The second diaphragm 36 is shown disengaged with the second valve seat 30 of the weir 22 exposing the common flow duct 16 immediately below the weir. The divider plate 42 is shown running diagonally across the weir from the first valve seat 26 and one weir end portion 23 down to the second valve seat 30 and the other end portion 23. The divider plate 42 separates the first flow duct 18 from the second flow duct 20.

FIG. 4 is a sectional taken along plane 4—4 of FIG. 2. The section line passes through the center of the weir 22 which is shown engaged by the first diaphragm 34. In that this view is from the opposite direction as FIG. 3, the divider plate 42 is shown running diagonally in a reverse angle from that shown in FIG. 3 and the second flow duct conduit 86 is shown on the right hand side and the first flow duct conduit 84 is shown on the left hand side.

The device operates as follows (referring to FIG. 1 for the purposes of the explanation): fluid flow will be presumed to enter the valve 10 by way of the common flow duct 16 and then flows to the first and second flow ducts 18, 20. Notably, the valve 10 also is intended to be used with fluid flow entering the valve 10 through the first and second flow ducts 18, 20 and exiting the valve 10 through the common flow duct 16. The valve 10 shown in FIG. 1 is in the unactuated mode with the first diaphragm 34 and the first compressor 38 engaged against the first valve seat 26 and obstructing flow into the first flow duct 18. Flow is directed over the weir 22 between the second valve seat 30 and the second diaphragm 36 into the second flow duct 20. Referring to FIG. 3, the flow is then directed into the distal portion 21 of the second flow duct 20 to exit the valve 10.

The valve as shown is in the unactuated mode, that is with the first diaphragm 34 engaged with the first valve seat 26 in the closure position held against the valve seat 26 by the bias means comprising the springs 62, 64 acting against the first piston 55 connected to the first compressor stem 50, first compressor 38, and the first diaphragm 34. The second diaphragm 36 is disengaged from the second valve seat 30 and is maintained in this position by the bias means comprising the spring 66 urging the second piston 57, second compressor stem 52, second compressor 40, and second diaphragm 36 away from the second valve seat 30.

Referring again the FIG. 1, the valve 10 is actuated by way of pressurization of air lines 76 which enter the valve through fittings 78 and 79 and air inlets 80 and 81. Pressurization of the first expansion chamber 58 urges the first piston 55 upward in the cylinder 54 overcoming the downward bias provided by springs 62, 64. The upward movement of the piston 55 draws the first compressor stem 50, first compressor 38, and the first diaphragm 34 away from the first valve seat 26 of the weir 22. The three-way weir valve 10 in the actuated mode permits the fluid flow to pass between the first valve seat 26 and the first diaphragm 34 into the first flow duct 18, down the top surface 87 of the divider plate 42 and out to the distal portion 19 of the first flow duct 18 and out the valve 10.

At the same time that the first expansion chamber 58 is being pressurized and expanded, the second expansion chamber 60 in the lower body portion 13 is also pressurized and expanded. Thus the second piston 57 engaged with the second cylinder 56 by way of the seal 70 is forced upward overcoming the bias of spring 66. As the second piston 57 moves upward, correspondingly the attached second compressor stem 52, second compressor 40, and second diaphragm 36 move into closure position by engaging the second valve seat 30 of the weir 22. Thus, the flow between the weir 22 and the second diaphragm 36 is obstructed.

In the embodiment shown, the valve 10 operates to open one diaphragm while moving the other diaphragm into the closure position. The three-way weir valve 10 can be arranged so that the diaphragms operate to open and close both diaphragms simultaneously or independently. Other operating means to engage and disengage the diaphragms are known and anticipated such as hydraulic means, manual means, or electro-mechanical means.

The valve housing 12 may be formed of any number of materials including but not limited to perfluoroalkoxy resin (PFA), polyvinylidene fluoride (PVDF), polyvinyl chloride (PVC), polypropylene (PP), or stainless steel. The diaphragm 30 may be formed of Viton or rubber-like fluoroelastomer and may have a lower surface of a different material to come in contact with the fluid such as polytetrafluoroethylene (PTFE).

Notably, the simple configuration of the valve makes it suitable for injection molding with little or no additional machining necessary.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A weir valve for use with external flow lines comprising:
   a. a valve housing with an open interior;
   b. the open interior comprising a common flow duct, a first flow duct having a distal portion and a second flow duct having a distal portion, the first flow duct positioned transversely to the common flow duct, the second flow duct positioned transversely of the common flow duct, the distal portions of the first and second flow ducts coplanar with the common flow duct, each flow duct connectable to an external flow line;
   c. an elongate weir traversing the open interior, the weir with a first edge portion and a second edge portion, defining a first valve seat and a second valve seat respectively, the weir further having a first face facing the common flow duct, the weir positioned substantially coplanar to the distal portions of the first and second flow ducts and to the common flow duct;
   d. a first diaphragm confronting the first valve seat and mounted within the housing to be moveable into and out of a closure position with said valve seat, an operating means for said diaphragm;
   e. a second diaphragm confronting the second valve seat and mounted within the housing seat and moveable into and out of a closure position with said valve seat, an operating means for said diaphragm; and
   f. the common flow duct communicating with the first flow duct between the first valve seat and the first diaphragm, the common flow duct communicating with the second flow duct between the second valve seat and the second diaphragm, whereby movement of the first diaphragm into the closure position with the first valve seat obstructs the communication between the common flow duct and the first flow duct; and movement of the second diaphragm into the closure position with the second valve seat obstructs the communication between the common flow duct and the second flow duct.

2. A weir valve for use with external flow lines comprising:
   a. a valve housing with an open interior;
   b. the open interior comprising a common flow duct, a first flow duct having a distal portion and a second flow duct having a distal portion, the distal portions of the first and second flow ducts collinear with each other, the common flow duct perpendicular to the distal portions, each flow duct connectable to an external flow line;
   c. an elongate weir traversing the open interior, the weir with a first edge portion and a second edge portion, defining a first valve seat and a second valve seat respectively, the weir further having a first face facing the common flow duct, the weir positioned parallel to the distal portions of the first and second flow ducts;
   d. a first diaphragm confronting the first valve seat and mounted within the housing to be moveable into and out of a closure position with said valve seat, an operating means for said diaphragm;
   e. a second diaphragm confronting the second valve seat and mounted within the housing seat and moveable into and out of a closure position with said valve seat, an operating means for said diaphragm; and
   f. the common flow duct communicating with the first flow duct between the first valve seat and the first diaphragm, the common flow duct communicating with the second flow duct between the second valve seat and the second diaphragm, whereby movement of the first diaphragm into the closure position with the first valve seat obstructs the communication between the common flow duct and the first flow duct; and movement of the second diaphragm into the closure position with the second valve seat obstructs the communication between the common flow duct and the second flow duct.

3. The valve of claim 2, wherein the first valve seat and second valve seat are opposite each other.

4. The valve of claim 3, wherein the weir has a second face opposite the first face, the second face adjoining the first flow duct and the second flow duct.

5. The valve of claim 4, further comprising a divider plate traversing the open interior between the weir and the valve housing, the divider plate extending across the second face of the weir and separating the first flow duct from the second flow duct.

6. The valve of claim 5, wherein the weir has two opposite end portions and the divider plate diagonally traverses the second face of the weir from the first valve seat and one end portion to the second valve seat and the other end portion.

7. The valve of claim 6, wherein the operating means for the first diaphragm comprises a first compressor engaging the first diaphragm confronting the first valve seat, the compressor moveable toward and away from the first valve seat, the operating means for the second diaphragm comprises a second compressor engaging the second diaphragm confronting the second valve seat, the second compressor moveable toward and away from the second valve seat, whereby the movement of the compressors toward and away from the valve seats moves the respective diaphragms into and out of the closure position with the respective valve seats.

8. The valve of claim 7, wherein the operating means for the first diaphragm and second diaphragm are pneumatic.

9. The valve of claim 7, wherein the operating means for the first diaphragm and second diaphragm are hydraulic.

10. The valve of claim 7, wherein the operating means for the first diaphragm and second diaphragm comprise electro-mechanical means.

* * * * *